Patented Oct. 22, 1940

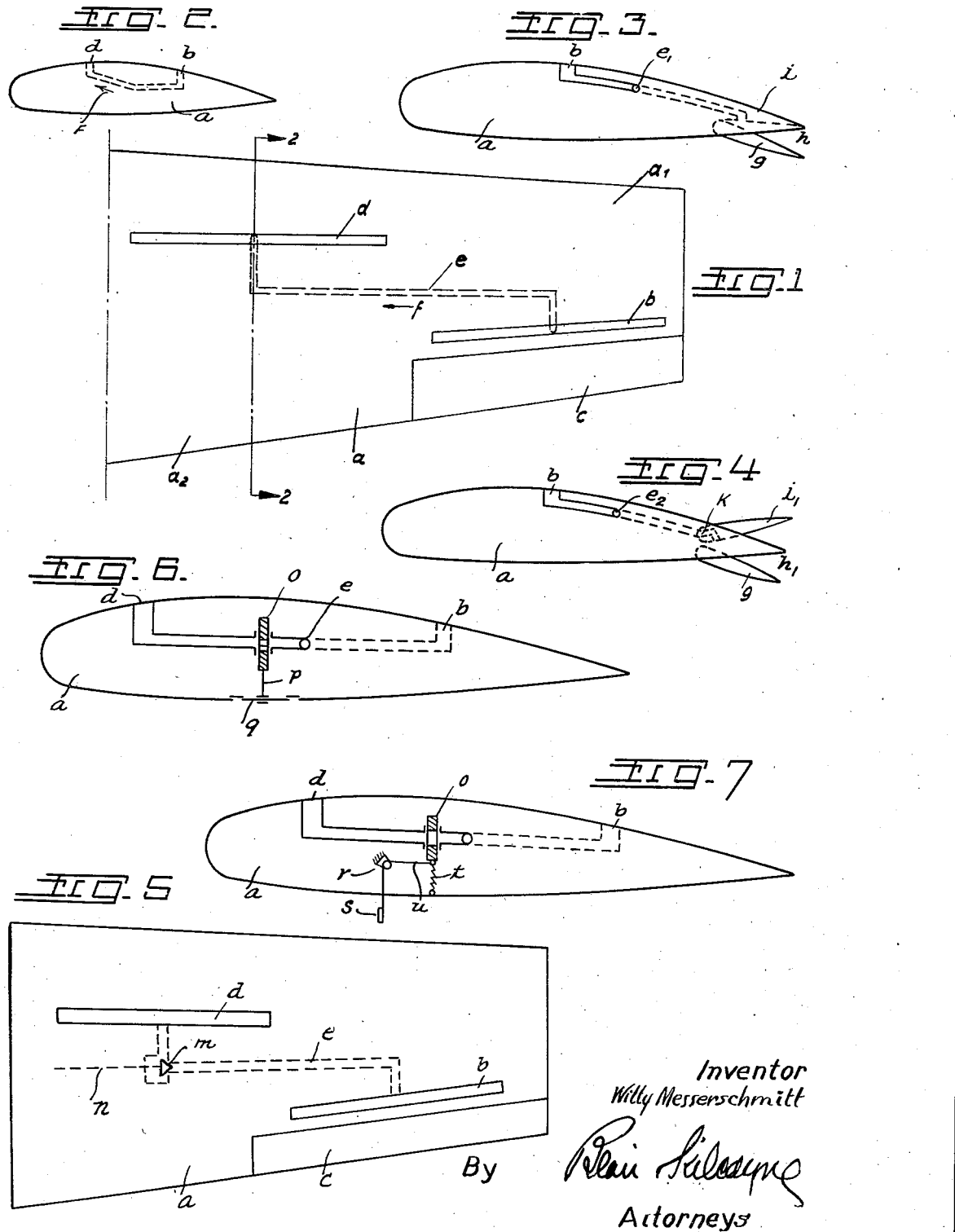

2,219,234

UNITED STATES PATENT OFFICE 2,219,234

ARRANGEMENT FOR SUCKING-OFF THE BOUNDARY LAYER ON AIRPLANE WINGS

Willy Messerschmitt, Augsburg, Germany

Application August 23, 1938, Serial No. 226,391
In Germany September 24, 1937

6 Claims. (Cl. 244—40)

The present invention relates to arrangements for sucking-off the boundary layer on airplane wings.

It is known to suck off the boundary layer on the surface of airplane wings in order to increase the lift obtainable with the wing. Some devices hitherto known use for this purpose separate sucking pumps, thus requiring additional power.

Furthermore it is known to connect such points at which it is desired to suck off the boundary layer to such other points in about the same cross-sections of the profile at which pressure is lower than at the sucking-off point, no driving power being required with this simple arrangement. The present invention has for its object to provide an improved arrangement by which in addition the lateral stability of the airplane is increased. According to the invention such points of the profile at a relatively great distance from the longitudinal axis of the airplane, at which relatively little suction is produced when the wing is exposed to a flow of fluid and where it is desired to remove the boundary layer, are placed in communication with such other points of the profile at a relatively small distance from the longitudinal axis of the airplane at which a greater depression is produced.

Preferably the sucking slot on the upper side of the wing is disposed in the rear range of the profile of the outer wing portion, and the suction in this slot is produced by means of another slot provided in the front range of the sucking side of the profile of the inner wing portion, this slot being in communication with the sucking slot through a passage provided in the wing. By this arrangement a safeguard against lateral tilting of the airplane in the stalled condition is incidentally provided in a particularly simple and reliable manner.

According to another constructional form of the invention, the sucking slot or the like is in communication with the space between the fixed portion of the profile and the landing or split flap.

A cut-off device may be provided in the communication passage for controlling the sucking effect, which may thus be produced whenever it is required for increasing the lift, e. g., in landing. The cut-off device may also be controlled automatically in accordance with the angle of incidence or the setting of the wing or with the speed of the airplane (dynamic pressure).

In order that the invention may be readily understood a number of constructional examples according to the invention, are schematically illustrated in the accompanying drawing, in which Figure 1 is a plan view of an airplane wing having two communicating slots.

Figure 2 being a section on line 2—2 of Figure 1 and

Figures 3 and 4 show constructional examples of the invention in connection with split flaps (so-called landing flaps).

Figures 5 to 7 show the arrangement of cut-off devices.

Referring now to the drawing, a supporting wing $a$ is provided at its outer range $a1$ with a sucking slot $b$, which in this case is arranged at about 70% of its chord, and behind which an aileron $c$ is arranged in a known manner. In the inner section $a2$ of the wing (nearer the fuselage) another slot $d$ is provided at about 30% of the chord, the two slots $b$, $d$ being in communication through a passage $e$. A cut-off valve device (not shown) may be provided in this passage.

In operation, air will flow through the passage $e$ in the direction of the arrow $f$ owing to greater depression obtaining at the slot $d$, which will suck the surface boundary layer of air from the slot $b$ located in the range of less depression, thus preventing diversion of the flow at the wing tips in the range of greater angles of incidence and further resulting in a decrease in drag.

In the construction according to Figure 3, the wing $a$ is provided in a known manner with a landing flap $g$ adapted to be pulled out downwardly. The sucking slot $b$ on the suction side of the wing profile communicates through a passage $e_1$ with the space $h$ between the pulled out landing flap $g$ and the fixed upper rear edge $i$ of the profile.

The construction according to Figure 4, is similar, except for the provision of a different type of landing or split flap, of which the upper part $i_1$ is also movable. In this case too, the space between the parts $i_1$ and $g$ of the landing flap is in communication with the sucking slot $b$ through a suitably formed recess $k$ of the element $i_1$ and a passage $e_2$. A cut-off device may of course also be provided in the passages $e_1$ and $e_2$, respectively, of the constructional forms according to Figure 3 and Figure 4.

Figure 5 shows the same construction as Figure 1 with the addition of a cut-off valve $m$ in the passage $e$, adapted to be operated by a push rod $n$ or equivalent means from the pilot's seat.

Figure 6 shows an arrangement for controlling the flow of air through the passage $e$ in accordance with the angle of attack. $o$ is a gate valve operatively connected by a rod $p$ to a diaphragm $q$ which is arranged flush with the surface of the wing. As the pressure at the outer surface of diaphragm $q$ varies with varying angles of attack, the gate valve $o$ is opened or closed accordingly.

In the arrangement of Figure 7 a gate valve $o$ is operated by a static disc $s$, connected with it through a bell-crank lever $u$ pivotally mounted in journals $r$.

A spring $t$ is arranged to counteract the dynamic air pressure so as to prevent movement of the disc $s$ till this pressure reaches a predetermined value at which it is desired that the valve $o$ should be opened or closed.

Having now described my invention, what I claim as new and desire to secure by Letters Patent is:

1. In an airplane wing the combined arrangement of a number of apertures and at least one double or twin landing flap of the split type comprising two flap elements, the arrangement comprising at least one aperture in the wing surface disposed rearwardly at a point of little suction in the profile of the outer wing section at a relatively great distance from the longitudinal axis of the airplane, where it is desired to remove the boundary layer, at least one further aperture in the space between two flap elements provided at a point of greater suction in the profile of the inner wing section at a relatively small distance from the longitudinal axis of the airplane and at least one passage through which the said apertures disposed at different distances from the longitudinal axis of the airplane are in communication.

2. An arrangement as claimed in claim 1, in which said passage comprises a port in one of said flap elements.

3. An airplane wing having a number of apertures including a first aperture in the wing surface disposed rearwardly at a point of little suction in the profile of the outer wing section and at a relatively great distance from the longitudinal axis of the airplane, where it is desired to remove the boundary layer, and a second aperture in the wing surface provided at a point of greater suction in the front portion of the profile of the inner wing section at a relatively small distance from the longitudinal axis of the airplane, and at least one passage in the wing through which the said apertures disposed at different distances from the longitudinal axis of the airplane are in communication, and cut-off means in said passage for controlling the flow of air therethrough.

4. An arrangement as claimed in claim 3, further comprising means controlled by the angle of attack of the wing for automatically controlling said cut-off means.

5. An arrangement as claimed in claim 3, further comprising means controlled by the dynamic pressure of the outer air caused by the relative movement of the wing in flight, for automatically controlling said cut-off means.

6. An arrangement as claimed in claim 3, further comprising a landing flap of the split type, a wall having a third aperture adjacent the inner side of said landing flap, and means forming a passage through which said last mentioned aperture communicates with said first mentioned aperture in the outer wing section.

WILLY MESSERSCHMITT.